United States Patent
Rittner et al.

(10) Patent No.: US 9,022,028 B2
(45) Date of Patent: May 5, 2015

(54) OXYGEN SUPPLY DEVICE

(75) Inventors: Wolfgang Rittner, Siblin (DE); Rüdiger Meckes, Berkenthin (DE)

(73) Assignee: B/E Aerospace Systems GmbH, Lübeck (DE)

( * ) Notice: Subject to any disclaimer, the term of this patent is extended or adjusted under 35 U.S.C. 154(b) by 1733 days.

(21) Appl. No.: 12/167,447

(22) Filed: Jul. 3, 2008

(65) Prior Publication Data

US 2009/0013996 A1   Jan. 15, 2009

(30) Foreign Application Priority Data

Jul. 4, 2007   (DE) .......................... 10 2007 031 043

(51) Int. Cl.
| | |
|---|---|
| F16K 31/02 | (2006.01) |
| A62B 7/00 | (2006.01) |
| A62B 9/02 | (2006.01) |
| A62B 18/02 | (2006.01) |
| A62B 18/10 | (2006.01) |
| B64D 10/00 | (2006.01) |

(52) U.S. Cl.
CPC ............... *A62B 18/025* (2013.01); *A62B 9/027* (2013.01); *A62B 18/10* (2013.01); *B64D 10/00* (2013.01)

(58) Field of Classification Search
USPC ............. 128/204.18, 204.21–204.23, 204.26, 128/204.29–205.12, 205.22–205.25
See application file for complete search history.

(56) References Cited

U.S. PATENT DOCUMENTS

| | | | |
|---|---|---|---|
| 3,395,701 A | 8/1968 | Bartlett, Jr. et al. | |
| 3,957,043 A | 5/1976 | Shelby | |
| 4,109,509 A * | 8/1978 | Cramer et al. ................. | 73/23.3 |
| 4,127,121 A | 11/1978 | Westenskow et al. | |
| 4,336,590 A | 6/1982 | Jacq et al. | |
| 6,173,711 B1 * | 1/2001 | Ruton ....................... | 128/204.26 |
| 2002/0088464 A1 * | 7/2002 | Truschel ................... | 128/204.18 |
| 2002/0139368 A1 | 10/2002 | Bachinski | |
| 2003/0084901 A1 * | 5/2003 | Martinez ................... | 128/204.26 |
| 2003/0106554 A1 * | 6/2003 | de Silva et al. .......... | 128/204.22 |
| 2003/0188744 A1 | 10/2003 | Deas et al. | |
| 2005/0217676 A1 * | 10/2005 | Parker ....................... | 128/205.23 |
| 2007/0044799 A1 * | 3/2007 | Hete et al. ................ | 128/205.11 |
| 2007/0193579 A1 * | 8/2007 | Duquette et al. .......... | 128/204.18 |
| 2009/0301489 A1 * | 12/2009 | Bloch et al. .............. | 128/204.23 |

FOREIGN PATENT DOCUMENTS

| | | |
|---|---|---|
| DE | 1 559 692 | 4/1971 |
| DE | 39 30 362 A1 | 3/1991 |
| GB | 1104849 A | 2/1968 |

* cited by examiner

*Primary Examiner* — Rachel Young
(74) *Attorney, Agent, or Firm* — McGlew & Tuttle, P.C.

(57) ABSTRACT

An oxygen supply device, preferably a pilot oxygen supply device, has an oxygen source and at least one oxygen mask. A breathing regulator is arranged between the oxygen source and the oxygen mask. An oxygen sensor is arranged downstream of this breathing regulator.

12 Claims, 1 Drawing Sheet

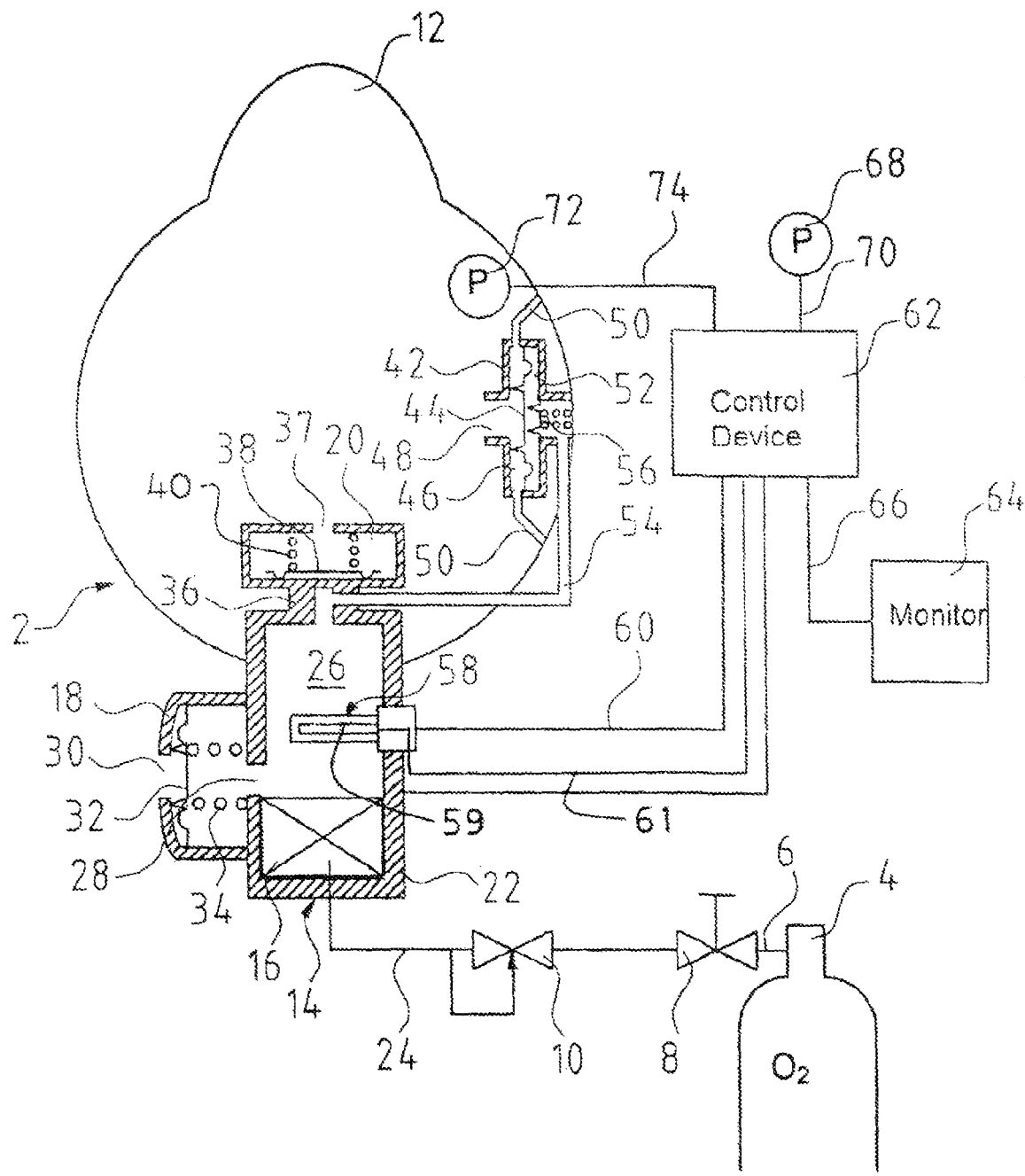

OXYGEN SUPPLY DEVICE

CROSS REFERENCE TO RELATED APPLICATIONS

This application claims the benefit of priority under 35 U.S.C. §119 of German Patent Application DE 10 2007 031 043.0 filed Jul. 4, 2007, the entire contents of which are incorporated herein by reference.

FIELD OF THE INVENTION

The invention relates to an oxygen supply device, particularly an oxygen supply device for an aircraft pilot.

BACKGROUND OF THE INVENTION

In aircraft, it is usual to provide oxygen supply devices with which the cockpit crew can be supplied with the requisite oxygen, for example in the event of decompression of the cockpit. These oxygen supply devices typically have an oxygen mask connected by a line to an oxygen reservoir. In the event of faulty behaviour or failure of these oxygen supply devices, replacement devices are normally also carried in aircraft, the use of which ensures the supply of oxygen to the pilot even in the event of failure of the actual oxygen supply device.

In the past, however, it has often been shown that such a failure of the oxygen supply device was not even noticed, which led to the pilots not using the replacement device also carried, despite there being a deficiency of oxygen. At high flight altitudes, this normally leads to a loss of consciousness of the pilot within a short time and, associated with this, often to the aircraft crashing.

SUMMARY OF THE INVENTION

Against this background, it is an object of the invention to devise an oxygen supply device which permits improved functional monitoring of the device and a clear indication of faults.

The oxygen supply device according to the invention, which is preferably a pilot oxygen supply device, has an oxygen source for providing the oxygen and at least one oxygen mask for dispensing the oxygen. Arranged between the oxygen source and the oxygen mask is a breathing regulator. An oxygen sensor is arranged downstream of this breathing regulator.

As will be explained in more detail in the further course, the oxygen sensor arranged downstream of the breathing regulator advantageously permits the serviceability of all the important components of the oxygen supply device to be monitored, from the oxygen source up to and including the breathing regulator.

The oxygen mask can be constructed both as a full mask, covering the entire face of the user, and also as a half mask covering only the mouth and nose of the user. The type of oxygen source is any desired, provided that it can ensure an adequate supply of oxygen. For example, chemical oxygen generators or oxygen bottles can be used as the oxygen source.

Between the oxygen source and the oxygen mask there can be arranged one or more pressure reducers, which reduce the oxygen pressure prevailing at the outlet of the oxygen source, step-by-step if necessary, to a desired breathing value. In principle, the oxygen supply device according to the invention has at least one pressure reducer, which is formed by the breathing regulator. The breathing regulator is used to expand the oxygen to the mask pressure required in the oxygen mask. If a plurality of pressure reducers or pressure regulating devices are provided in the line connection between oxygen source and oxygen mask, the breathing regulator always forms the last pressure regulating device in the flow direction, that is to say the pressure regulating device which is arranged closest to the oxygen mask.

The breathing regulator can be operated pneumatically or electrically. It can be constructed as such a regulator which provides the user of the oxygen mask with a constant oxygen flow. In addition, the breathing regulator can be what is known as an impulse breathing regulator. Such an impulse breathing regulator provides the user of the oxygen mask with a limited bolus volume of oxygen only in an initial inhalation phase, in which the oxygen diffuses into the arterial blood via the lung system, whereupon the mask user subsequently breathes in the oxygen-poor ambient air.

The oxygen sensor of the oxygen supply device according to the invention is designed to determine an oxygen pressure or oxygen partial pressure. The arrangement of the oxygen sensor on the outlet or downstream side of the breathing regulator, for example in the immediate vicinity of the mask body or else inside the mask body of the oxygen mask, advantageously permits malfunctions in substantially all the components arranged in the flow path from the oxygen source to the oxygen mask, for example valves and pressure regulating devices arranged there, including the breathing regulator, and also an inadequate or missing discharge of oxygen from the oxygen source itself, to be determined with only one sensor element, the oxygen sensor. Furthermore, by using the oxygen sensor, leaks occurring within the line connection can also be detected because of the pressure loss associated therewith.

The determination of possible malfunctions and leaks is in this case possible via a comparison of the values of the oxygen pressure or oxygen partial pressure prevailing on the outlet side of the pressure regulator, as determined by the oxygen sensor, with predefined desired pressure values. This desired/actual value comparison is performed by a control device, which expediently has a signal connection to the oxygen sensor. If the pressure values registered by the oxygen sensor lie below the pressure values predefined for the outlet side of the breathing regulator, this indicates the risk of an inadequate oxygen supply to the user of the oxygen supply device. This defective supply or inadequate supply with oxygen can be attributed to a malfunction of any component or possibly a plurality of components arranged between oxygen sensor and oxygen source or to a leak between oxygen sensor and oxygen source.

In order to be able to warn the user of the oxygen supply device according to the invention about a possible inadequate oxygen supply, the oxygen sensor expediently has a signal connection to a control device having a display function. This control device is preferably the control device with which the evaluation of the oxygen pressure or oxygen partial pressure values determined by the oxygen sensor is performed. The control device can have an optical and/or acoustic display, which reports any possible malfunction of the oxygen supply device. This display can be an integral constituent part of the control device or arranged separately from the latter. The display function of the control device is advantageously performed by a monitor which is preferably arranged in the immediate vicinity of the user of the oxygen supply device and, particularly advantageously, is arranged in his/her direct field of view and thus can particularly easily be perceived by the user of the oxygen supply device according to the invention.

In particular when the breathing regulator is constructed as an impulse breathing regulator, an inhalation valve is advantageously arranged between breathing regulator and oxygen mask, i.e. downstream of the breathing regulator. The inhalation valve closes the line connection from the oxygen source to the oxygen mask and opens a flow path into the mask body only during inhalation. To this end, the inhalation valve can preferably be designed to be controllable by the breathing activity itself, i.e. by the negative pressure produced within the mask body during inhalation. The inhalation valve can be arranged at a distance from the oxygen mask in the line connection between the breathing regulator and the oxygen mask. However, the inhalation valve is preferably arranged directly on the mask body of the oxygen mask.

Although the oxygen sensor can also be arranged within the mask body of the oxygen mask, it is preferably arranged in the line connection between the breathing regulator and the inhalation valve. As compared with that arrangement within the mask body, this arrangement of the oxygen sensor has the advantage that the moisture getting into the mask body with the exhaled air during exhalation cannot come into contact with the oxygen sensor because of the inhalation valve which is closed during exhalation, which moisture could otherwise distort the measured results from said oxygen sensor.

In a further advantageous embodiment of the oxygen supply device according to the invention, an air mixing valve is provided in the line connection between breathing regulator and inhalation valve. In this case, the oxygen sensor is then preferably arranged downstream of the air mixing valve. The air mixing valve is a valve communicating with the ambient air or cockpit air. The air mixing valve is expedient in particular when the breathing regulator is designed as an impulse breathing regulator and ambient air also has to be supplied to the user of an oxygen mask. The ambient air can then be provided via the air mixing valve.

The breathing regulator and the oxygen sensor are advantageously arranged in an integral component. It is further preferred for this integral component to have an inhalation valve and an air mixing valve as well. The breathing regulator, the air mixing valve, the oxygen sensor and finally the inhalation valve are then arranged in this component, preferably one after the other in the direction of flow through the component. In addition, a substantially unoccupied internal space, which forms a mixing chamber, is preferably provided in the component. This mixing chamber is bounded on the inlet side by the breathing regulator and on the outlet side by the inhalation valve. The inlet of the air mixing valve opens out into the mixing chamber. Furthermore, the oxygen sensor is arranged in the mixing chamber, preferably downstream of the air mixing valve, and, in this arrangement, registers at least the oxygen partial pressure of the mixed air.

The component preferably forms part of the oxygen mask. Thus, the component can be arranged on the outside of the mask body, it being possible for the outlet of the inhalation valve to open into the interior of the mask body, facing the face of the user of the oxygen mask.

A further advantageous embodiment of the oxygen supply device according to the invention provides means downstream of the breathing regulator for registering the breathing activity of a mask user. In this way, with the oxygen supply device according to the invention, it is possible to monitor not only the serviceability of the entire device but also the breathing of the user and to make him/her or other persons aware of possible breathing problems, so that countermeasures can be taken in good time.

The means for registering the breathing activity are advantageously formed by a sensor for registering an air mass flow. The sensor for registering an air mass flow expediently has a signal connection to a control device, by means of which it is possible to check whether the air mass flow values measured by the sensor for each breath are located in a predefined measured value window.

Particularly advantageously, the means for registering the breathing activity form an integral constituent part of the oxygen sensor. This means that the oxygen sensor provided is a sensor element which is constructed in such a way that, by using it on the outlet side of the breathing regulator or possibly of the air mixing valve, it is possible to register not only an oxygen partial pressure but also air mass flows present there.

In order to be able to match the quantity of oxygen discharged by the breathing regulator or the oxygen pressure in the mask body to the flight altitude or to the cockpit pressure, the control device preferably has a signal connection to an ambient pressure sensor. In this embodiment, based on the cockpit pressure determined by the ambient pressure sensor and based on the actual oxygen pressure registered by the oxygen sensor, the contro device is able to determine the opening times of the breathing regulator which are needed to provide the user of the oxygen mask with an adequate quantity of oxygen with regard to the flight altitude.

If the breathing regulator, as preferably provided, is constructed as an electronic controller, the control device preferably also serves as a regulating unit for the breathing regulator. In this case, the regulating unit is expediently connected to a pressure sensor arranged in the oxygen mask. With the aid of the pressure sensor, by using the preferably continuously determined internal mask pressure, it is possible to determine whether the user of the oxygen mask is currently in an inhalation or exhalation phase. By means of the control device, the actuation of the breathing regulator can then be coordinated with the breathing rhythm of the user of the oxygen supply device. In this way, it is ensured that the user is provided with an adequate quantity of oxygen when inhaling.

In the following text, the invention is explained by using an exemplary embodiment illustrated in a drawing figure. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:
The only FIGURE is a schematic view showing the principles of an oxygen supply device according to the invention.

DESCRIPTION OF THE PREFERRED EMBODIMENT

Referring to the drawing in particular, an oxygen supply device, in which an oxygen mask 2 is connected by a line to an oxygen bottle 4, is shown schematically. On an oxygen outlet 6 of the oxygen bottle 4, a shut-off valve 8 and a pressure reducer 10 are arranged directly one after the other in a manner known per se in the flow direction. The shut-off valve 8 is used to open and close the oxygen bottle 4. By using the pressure reducer 10, the oxygen pressure prevailing in the oxygen bottle 4, which can be more than 100 bar, is reduced to an average pressure of about 2 to 3 bar. On the outlet side, the pressure reducer 10 has a line connection to the oxygen mask 2.

The oxygen mask 2 is constructed as a half mask and has a mask body 12 covering mouth and nose. On the outside of the mask body 12 there is arranged a component 14, which contains an electronic breathing regulator 16, an air mixing valve 18 and an inhalation valve 20. The component 14 has a hollow cylindrical base body 22, in the interior of which the breathing regulator 16 is arranged at an end facing away from the mask body 12. Via a supply line 24 led through the base body 22, the oxygen inlet of the breathing regulator 16 is connected by a line to the oxygen outlet of the pressure reducer 10. On the outlet side of the breathing regulator 16, that is to say downstream of an oxygen outlet, not illustrated in the figure, of the breathing regulator 16, the base body 22 of the component 14 forms an unoccupied internal space or mixing chamber 26.

In the exemplary embodiment illustrated in the figure, the air mixing valve 18 is arranged on the outside of the base body 22, in the region of the internal space 26. Via an aperture 28 provided downstream of the breathing regulator 16 on the circumferential wall of the base body 22, the air mixing valve 18 has a flow connection to the internal space 26 of the base body 22.

The air mixing valve 18 has a flow inlet 30 communicating with the surroundings of the oxygen mask 2. The flow inlet 30 of the air mixing valve 18 is closed by a valve body 32 in the form of a diaphragm. In this case, the valve body 32 is forced by a helical spring 34 into a position closing the flow inlet 30.

The inhalation valve 20 is likewise arranged outside the base body 22 of the component 14 in the exemplary embodiment illustrated. The inhalation valve 20 has a flow connection to the internal space 26 of the base body 22 via a flow duct 36. The flow duct 36 is arranged at the end of the base body 22 that is at a distance from the breathing regulator 16 in the longitudinal direction of the base body 22.

The inhalation valve 20 has a flow outlet 37, which opens in the interior of the body 12 of the oxygen mask 2. The outlet on the downstream side of the flow duct 36 is closed by a valve body 38 arranged in the inhalation valve 20. In this case, the valve body 38 is prestressed by means of a helical spring 40 in the direction of the narrow section 36.

In the interior of the mask body 12 there is arranged an exhalation valve 42. The valve housing of the exhalation valve 42 is divided by a diaphragm 44 into two valve parts 46 and 52 that are separated fluidically from each other. In this case, a first valve part 46 forms a flow path from an inlet opening 48 in the internal space of the mask body 12 to a large number of outlet openings 50, which are arranged on the outside of the mask body 12. A second valve part 52 communicates via a bypass duct 54 with the flow duct 36, the flow duct 36 and the bypass duct 54 connecting the internal space 26 of the component 14 in a fluidically conductive manner to the second valve part 52 of the exhalation valve 42. Arranged in the second valve part 52 of the exhalation valve 42 is a spring component 56. In interaction with a positive pressure prevailing in the internal space 26 of the component 14 with respect to the internal mask pressure, the diaphragm 44 having the spring component 56 is prestressed into the closed position of the exhalation valve 42.

In the internal space or mixing chamber 26 of the base body 22, an oxygen sensor 58 is arranged downstream of the air mixing valve 18 and downstream of the aperture 28. The oxygen sensor 58 has a signal connection to a control device 62 via an electric line 60. The means for registering the breathing activity is advantageously formed by a sensor 59 for registering an air mass flow. The sensor 59 for registering an air mass flow expediently has a signal connection 61 to a control device 62, by means of which it is possible to check whether the air mass flow values measured by the sensor 59 for each breath are located in a predefined measured value window. The control device 62 has a display function by means of a monitor 64, which is connected to the control device 62 by an electric line 66. Furthermore, an ambient pressure sensor 68 has a signal connection to the control device 62 via a line 70, and a pressure sensor 72 arranged in the interior of the mask body 12 has a signal connection to the control device 62 via a line 74. The pressure sensor 72 is used to register the internal mask pressure, which changes cyclically because of the successive inhalation and exhalation phases. On the basis of the pressure values provided by the pressure sensor 72, the control device 62 is able to drive the breathing regulator 16 in a timed manner in such a way that the requisite quantity of oxygen is available to the user of the oxygen supply device at the start of inhalation.

In the following text, the functional monitoring of the oxygen supply device according to the invention will be described by using the drawing figure.

By means of the ambient pressure sensor 68, the flight-altitude-dependent air pressure prevailing in the cockpit of an aircraft is measured. On the basis of the pressure values determined by the ambient pressure sensor 68, the control device 62 determines the oxygen demand of the user of the oxygen supply device and sets the opening times of the breathing regulator 16 appropriately. As a result, desired values for the oxygen partial pressure that are proportional to the opening times result in the internal space 26 of the component 14. The real or actual values of the oxygen partial pressure are registered by the oxygen sensor 58 and compared with the desired values by the control device 62.

If the desired and actual values of the oxygen partial pressure agree, this indicates a satisfactory operating behaviour of the oxygen supply device. If the pressure values determined by the oxygen sensor 58 lie below the desired values predefined by the control device 62, this means an inadequate oxygen supply to the user of the oxygen supply device. This deficient supply can be attributed to a malfunction of one or more of the components connected upstream of the oxygen sensor 58 in the flow direction. In detail, this can mean that the oxygen bottle 4 can be empty, shut-off valve 8, pressure reducer 10, breathing regulator 16 or air mixing valve 18 have a defect or there is a leak along the flow path from the oxygen bottle 4 to the oxygen sensor 58.

If an excessively low actual value of the oxygen partial pressure has been determined by the control device 62 with the aid of the oxygen sensor 58, this is displayed on the monitor 64 by the control device so that it is easily visible by the user of the oxygen supply device. The latter can then immediately use a replacement device for the oxygen supply.

While a specific embodiment of the invention has been shown and described in detail to illustrate the application of the principles of the invention, it will be understood that the invention may be embodied otherwise without departing from such principles.

APPENDIX

| LIST OF REFERENCE CHARACTERS | |
| --- | --- |
| 2 | Oxygen mask |
| 4 | Oxygen bottle |

APPENDIX-continued

LIST OF REFERENCE CHARACTERS

| | |
|---|---|
| 6 | Oxygen outlet |
| 8 | Shut-off valve |
| 10 | Pressure reducer |
| 12 | Mask body |
| 14 | Component |
| 16 | Breathing regulator |
| 18 | Air mixing valve |
| 20 | Inhalation valve |
| 22 | Base body |
| 24 | Supply line |
| 26 | Internal space, mixing chamber |
| 28 | Aperture |
| 30 | Flow inlet |
| 32 | Valve body |
| 34 | Helical spring |
| 36 | Flow duct |
| 38 | Valve body |
| 40 | Helical spring |
| 42 | Exhalation valve |
| 44 | Diaphragm |
| 46 | Valve part |
| 48 | Inlet opening |
| 50 | Outlet openings |
| 52 | Valve part |
| 54 | Bypass duct |
| 56 | Spring component |
| 58 | Oxygen sensor |
| 60 | Line |
| 62 | Control device |
| 64 | Monitor |
| 66 | Line |
| 68 | Ambient pressure sensor |
| 70 | Line |
| 72 | Pressure sensor |
| 74 | Line |

What is claimed is:

1. An oxygen supply device comprising:
an oxygen source;
an oxygen mask;
a pressure sensor arranged in said oxygen mask;
a breathing regulator arranged between said oxygen source and said oxygen mask, said breathing regulator comprising an electronic controller;
an oxygen sensor arranged downstream of said breathing regulator wherein said breathing regulator and said oxygen sensor are arranged in an integral component;
a breathing activity means for registering breathing activity of a mask user, said breathing activity means comprising a sensor for registering an air mass flow arranged downstream of said breathing regulator wherein said breathing activity means for registering breathing activity forms an integral constituent part of said oxygen sensor;
a control device having a display function, wherein said oxygen sensor has a signal connection to said control device and said control device is connected to said pressure sensor arranged in said oxygen mask and connected to said breathing activity means, said control device indicating a deficient supply of oxygen at said oxygen sensor via said display function and said control device comprising a regulating unit for regulating said breathing regulator; and
an exhalation valve comprising a valve element that has an open position to form a flow path from an internal space of said mask body to an outlet and a bias means including a line connecting an internal space of said integral component to said exhalation valve such that said valve element is moved to a closed position by fluid pressure prevailing in said internal space of said integral component.

2. An oxygen supply device according claim 1, further comprising:
an inhalation valve arranged between said breathing regulator and said oxygen mask to close a line connection from the oxygen source to the oxygen mask and to open a flow path into the mask body only during inhalation.

3. An oxygen supply device according claim 2, wherein said oxygen sensor is arranged in a line connection between said breathing regulator and said inhalation valve.

4. An oxygen supply device according claim 3, further comprising:
an air mixing valve provided in said line connection between said breathing regulator and said inhalation valve, said oxygen sensor being arranged downstream of said air mixing valve.

5. An oxygen supply device according claim 4, wherein said inhalation valve and said air mixing valve are arranged in said integral component.

6. An oxygen supply device according to claim 5, wherein said integral component forms part of said oxygen mask.

7. An oxygen supply device according claim 1, further comprising:
an ambient pressure sensor, wherein said control device has a signal connection to said ambient pressure sensor.

8. A pilot oxygen supply device comprising:
an oxygen source;
an oxygen mask;
a pressure sensor arranged in said oxygen mask;
a breathing regulator arranged in a line connection between said oxygen source and said oxygen mask, said breathing regulator comprising an electronic controller;
an oxygen sensor arranged downstream of said breathing regulator;
a breathing activity means for registering breathing activity of a mask user, said breathing activity means comprising a sensor for registering an air mass flow arranged downstream of said breathing regulator wherein said breathing activity means for registering breathing activity forms an integral constituent part of said oxygen sensor;
a control device having a display function, wherein said oxygen sensor has a signal connection to said control device and said pressure sensor arranged in said oxygen mask has a signal connection to said control device and said breathing activity means has a signal connection to said control device, said control device detecting a deficient supply of oxygen at said oxygen sensor that can be attributed to a malfunction of one or more of the components connected upstream of the oxygen sensor and indicating the deficient supply of oxygen via said display function and said control device comprising a regulating unit driving said breathing regulator in a timed manner such that a requisite quantity of oxygen is available in the oxygen mask at the start of inhalation; and
an inhalation valve arranged on the mask body between said breathing regulator and said oxygen mask, said oxygen sensor being arranged in a line connection between said breathing regulator and said inhalation valve, said inhalation valve closing the line connection from the oxygen source to the oxygen mask and opening a flow path into the mask body only during inhalation.

9. An oxygen supply device according claim 8, further comprising:
an air mixing valve provided in said line connection between said breathing regulator and said inhalation valve, said oxygen sensor being arranged downstream of said air mixing valve.

10. An oxygen supply device according claim 8, further comprising:
an ambient pressure sensor, wherein said control device has a signal connection to said ambient pressure sensor.

11. A pilot oxygen supply device comprising:
an oxygen source;
an oxygen mask;
a pressure sensor arranged in said oxygen mask;
an integral component comprising a breathing regulator arranged in a line connection between said oxygen source and said oxygen mask, said breathing regulator comprising an electronic controller, and an oxygen sensor arranged in the line connection between said oxygen source and said oxygen mask downstream of said breathing regulator, said integral component being fixed to said oxygen mask;
a breathing activity means for registering breathing activity of a mask user, said breathing activity means comprising a sensor for registering an air mass flow arranged downstream of said breathing regulator wherein said breathing activity means for registering breathing activity forms an integral constituent part of said oxygen sensor;
a control device having a display function, wherein said oxygen sensor has a signal connection to said control device and said pressure sensor arranged in said oxygen mask has a signal connection to said control device and said breathing activity means has a signal connection to said control device, said control device detecting a deficient supply of oxygen at said oxygen sensor that can be attributed to a malfunction of one or more components connected upstream of the oxygen sensor and indicating the deficient supply of oxygen via said display function and said control device comprising a regulating unit driving said electronic controller of said breathing regulator in a timed manner such that a requisite quantity of oxygen is available in the oxygen mask at the start of inhalation; and
an exhalation valve comprising a valve element that has an open position to form a flow path from an internal space of said mask body to an outlet and a bias means including a line connecting an internal space of said integral component to said exhalation valve such that said valve element is moved to a closed position by fluid pressure prevailing in said internal space of said integral component.

12. An oxygen supply device according claim 11, further comprising:
an inhalation valve arranged between said breathing regulator and said oxygen mask, said oxygen sensor being arranged in a line connection between said breathing regulator and said inhalation valve, said inhalation valve closing the line connection from the oxygen source to the oxygen mask and opening a flow path into the mask body only during inhalation;
an air mixing valve provided in said line connection between said breathing regulator and said inhalation valve, said oxygen sensor being arranged downstream of said air mixing valve; and
an ambient pressure sensor, wherein said control device has a signal connection to said ambient pressure sensor.

* * * * *